United States Patent
Tsunoda et al.

(10) Patent No.: US 7,917,608 B2
(45) Date of Patent: Mar. 29, 2011

(54) WIRELESS COMMUNICATION APPARATUS SELECTIVELY CONNECTING TO PERIPHERAL APPARATUSES

(75) Inventors: Naoki Tsunoda, Machida (JP); Hiroaki Uchiyama, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 1121 days.

(21) Appl. No.: 11/501,795

(22) Filed: Aug. 10, 2006

(65) Prior Publication Data

US 2007/0038735 A1   Feb. 15, 2007

(30) Foreign Application Priority Data

Aug. 11, 2005 (JP) .................................. 2005-233516

(51) Int. Cl.
  *G06F 15/173* (2006.01)
  *G06F 3/00* (2006.01)
(52) U.S. Cl. .......... 709/223; 709/224; 709/227; 710/15; 710/17; 710/19; 370/310; 370/338
(58) Field of Classification Search ................... 709/223
See application file for complete search history.

(56) References Cited

U.S. PATENT DOCUMENTS

| | | | |
|---|---|---|---|
| 5,768,531 A * | 6/1998 | Lin ................ | 709/242 |
| 6,842,460 B1 * | 1/2005 | Olkkonen et al. ........... | 370/465 |
| 6,934,269 B1 * | 8/2005 | Hasha et al. .................... | 370/312 |
| 6,941,394 B2 * | 9/2005 | Frank et al. ...................... | 710/62 |
| 7,006,836 B2 | 2/2006 | Yokoyama ................ | 455/456.1 |
| 7,076,210 B2 * | 7/2006 | Sasai et al. ..................... | 455/41.2 |
| 7,349,983 B2 * | 3/2008 | van Oldenborgh et al. ... | 709/238 |
| 7,349,984 B2 * | 3/2008 | van Oldenborgh et al. ... | 709/238 |
| 7,813,354 B1 * | 10/2010 | Norris ........................... | 370/401 |
| 2002/0040393 A1 * | 4/2002 | Christensen .................. | 709/224 |
| 2002/0135685 A1 | 9/2002 | Tsunoda ..................... | 348/231.2 |
| 2003/0100315 A1 * | 5/2003 | Rankin .......................... | 455/456 |
| 2003/0210340 A1 * | 11/2003 | Frederick Romanowich ................ | 348/272 |
| 2004/0125214 A1 | 7/2004 | Oka et al. .................... | 348/211.3 |
| 2004/0203359 A1 * | 10/2004 | Sasai et al. .................... | 455/41.1 |
| 2004/0233292 A1 | 11/2004 | Tsunoda ..................... | 348/207.1 |
| 2004/0243712 A1 * | 12/2004 | Sakai et al. .................... | 709/227 |
| 2004/0267876 A1 * | 12/2004 | Kakivaya et al. ............. | 709/200 |
| 2005/0058109 A1 * | 3/2005 | Ekberg .......................... | 370/338 |
| 2005/0108427 A1 * | 5/2005 | Datta ............................ | 709/238 |
| 2005/0135286 A1 * | 6/2005 | Nurminen et al. ............ | 370/310 |
| 2005/0193106 A1 * | 9/2005 | Desai et al. .................... | 709/223 |
| 2008/0228877 A1 * | 9/2008 | Van Datta ...................... | 709/204 |
| 2008/0279161 A1 * | 11/2008 | Stirbu et al. .................... | 370/338 |
| 2009/0141692 A1 * | 6/2009 | Kasslin et al. ................. | 370/338 |

FOREIGN PATENT DOCUMENTS

GB         2 404 310 B         1/2006
(Continued)

*Primary Examiner* — Henry W Tsai
*Assistant Examiner* — Steven G Snyder
(74) *Attorney, Agent, or Firm* — Dickstein Shapiro LLP

(57) ABSTRACT

There is provided a wireless communication apparatus where a searching condition according to connection schemes for to-be-searched peripheral apparatuses is set, and a connection request transmitting source apparatus transmits a service searching request to the peripheral apparatuses to wait for detection of the peripheral apparatuses, when a peripheral apparatus is detected, it is determined whether or not the peripheral apparatus matches with the set searching condition, if the peripheral apparatus matches with the searching condition, the peripheral apparatus is registered in a system, so that one peripheral apparatus is determined, after that the service searching request is transmitted again through the searching communication, the detection of the peripheral apparatuses is waited for, and a connection establishment process is performed on the extracted peripheral apparatuses.

11 Claims, 14 Drawing Sheets

FOREIGN PATENT DOCUMENTS

| | | |
|---|---|---|
| JP | 2002-015654 | 1/2002 |
| JP | 2002-191079 | 7/2002 |
| JP | 2002-288109 | 10/2002 |
| JP | 2003-274272 | 9/2003 |
| JP | 2003-274274 | 9/2003 |
| JP | 2003-319326 | 11/2003 |
| JP | 2004-048158 | 2/2004 |
| JP | 2004-215088 | 7/2004 |
| JP | 2004-363979 | 12/2004 |

* cited by examiner

TOP OF CAMERA

FRONT OF CAMERA

REAR OF CAMERA

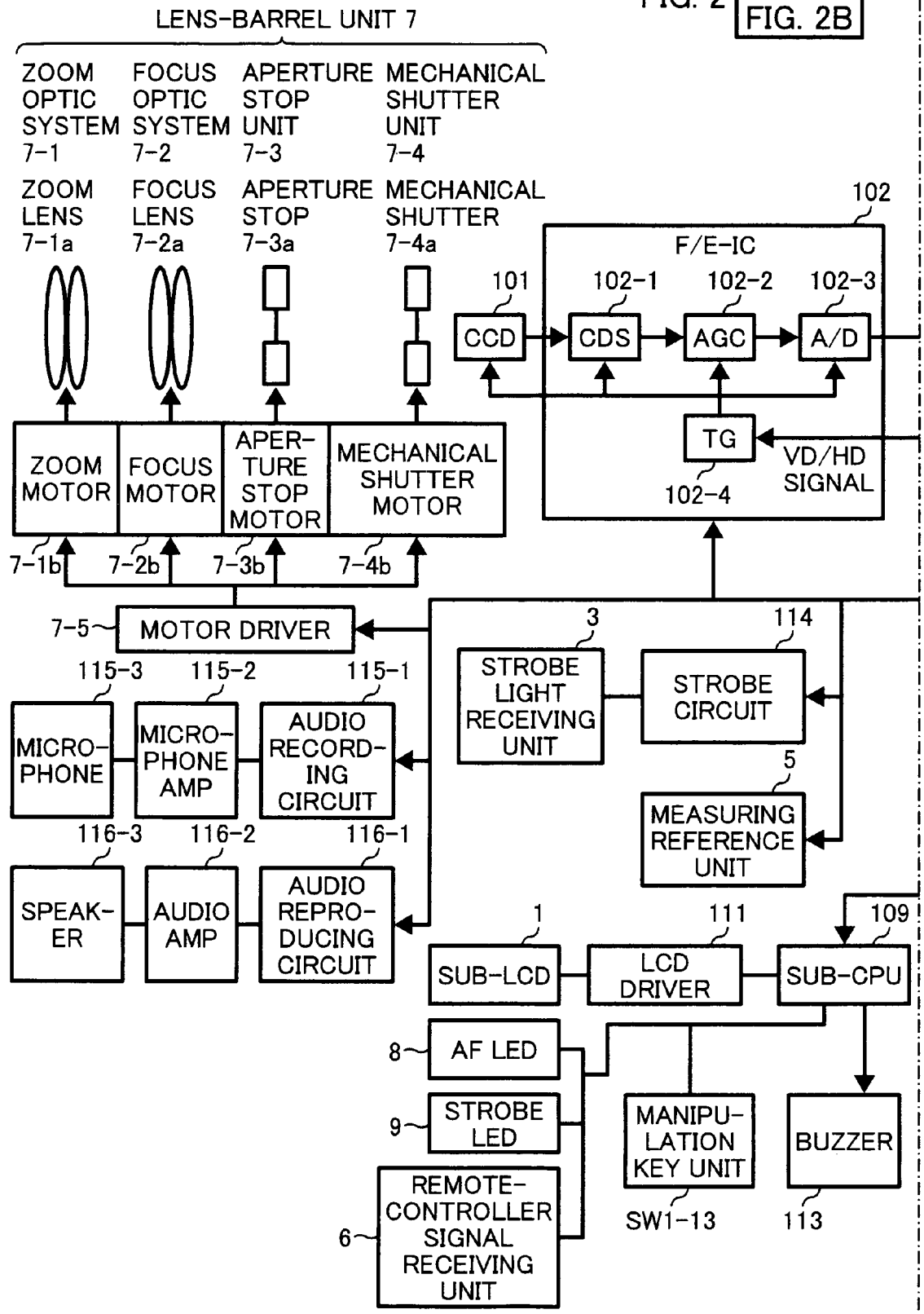

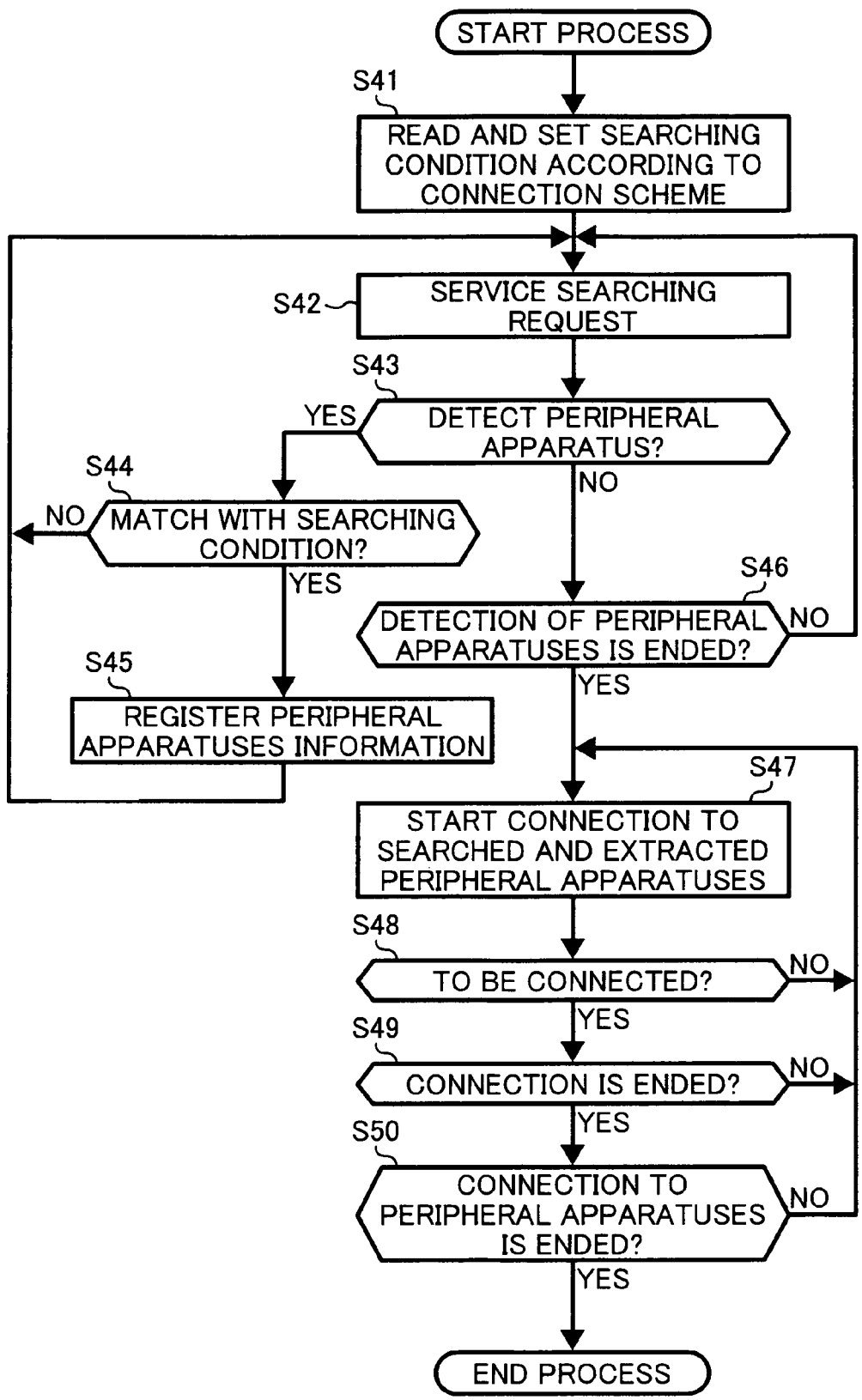

WIRELESS COMMUNICATION APPARATUS SELECTIVELY CONNECTING TO PERIPHERAL APPARATUSES

BACKGROUND OF THE INVENTION

1. Field of the Invention

The present invention relates to a wireless communication apparatus, a wireless communication method, a wireless communication program, and a recording medium recording the program capable of performing wireless communication to a plurality of peripheral apparatuses having a wireless communication function.

2. Description of Related Art

Conventionally, in a wireless communication environment, there are apparatuses supporting various services are connected to each other through wireless communication. As an example, the wireless communication apparatus may be located within communication coverage so as to be connected to apparatus such as a printer apparatus and a GPS (Global Positioning System) apparatus through Bluetooth (registered trade mark).

In case of using the Bluetooth, a connection request transmitting source apparatus staring communication transmits as a broadcast message a query message for searching whether or not an apparatus exist in the vicinity thereof A peripheral apparatus receiving the message from the connection request transmitting source apparatus sends a response message to the query message to the connection request transmitting source apparatus. The connection request transmitting source apparatus sequentially receives the response messages from the peripheral apparatuses in the vicinity thereof so that a plurality of the communicatable peripheral apparatus in the vicinity thereof can be searched. The connection request transmitting source apparatus selects and specifies the timing of starting communication according to information of the response messages, and then, performs the connection process to the peripheral apparatuses.

In addition, as a conventional technique for performing longtime communication using the Bluetooth, image information is stored in an image display memory in an image pickup apparatus, and a communication apparatus performing communication to the image pickup apparatus through the Bluetooth receives the image information stored in the image display memory in the image pickup apparatus, so that a user is allowed to search the image information in the image pickup apparatus through the communication apparatus (or example, see Japanese Unexamined Patent Application Publication No. 2002-191079).

However, in the aforementioned conventional LAN (Local Area Network) wireless communication system, all the apparatuses in the vicinity of the connection request transmitting source apparatus become the to-be-searched objects. Therefore, in a case where there are a large number of apparatuses in the vicinity thereof there is a problem in that a large number of the response messages may be received.

In addition, in such a conventional wireless communication system, apparatuses having entirely different connection schemes including a communication scheme that communication is performed at a need time such as printing out transmission of a wireless communication apparatus as an connection request transmitting source to a printer apparatus and a communication scheme that communication is performed at all time such as GPS data transmission of the GPS apparatus to the wireless communication apparatus. In addition, a plurality of the apparatuses may be connected simultaneously.

In terms of convenience for user' usage, the connection-ability to various peripheral apparatuses is important. However, it is very preferable that an apparatus can be simply connected to only the peripheral apparatuses matching with usage for a purpose even in environment where there are peripheral apparatuses having various connection schemes in the vicinity thereof.

In other words, it is preferable that time and cost for extracting only the peripheral apparatuses matching with usage for a purpose is reduced.

In addition, in the technique disclosed in the aforementioned Japanese Unexamined Patent Application Publication No. 2002-191079, the information of the image pickup apparatus is to be searched, but searching and extracting of the information of the to-be-connected apparatuses are not taken into consideration.

SUMMARY OF THE INVENTION

In order to solve the aforementioned problems, an object of the present invention is to provide a wireless communication apparatus, a wireless communication method, a wireless communication program, and a recording medium recording the program capable of extracting only the peripheral apparatuses matching with usage of a purpose even in environment where there are peripheral apparatuses having various connection schemes in the vicinity thereof.

In order to achieve the object, according to an aspect of the present invention, there is provided a wireless communication apparatus which can perform wireless communication to a plurality of peripheral apparatuses having a wireless communication function, the wireless communication apparatus comprising: a searching condition setting unit which sets a searching condition according to connection schemes for the peripheral apparatuses; and an extracting unit which performs searching communication based on the searing condition set by the searching condition setting unit to extract only the peripheral apparatuses matching with the searching condition.

BRIEF DESCRIPTION OF THE DRAWINGS

FIG. 12 is a flowchart showing an example of operations according to a sixth embodiment.

DETAILED DESCRIPTION OF THE PREFERRED EMBODIMENTS

Hereinafter, embodiments where a wireless communication apparatus, a wireless communication method, a wireless communication program, and a recording medium recording the program is employed by a wireless communication system including an image pickup terminal apparatus having a wireless communication function will be described in detail with reference to the accompanying drawings.

Figure 1A:
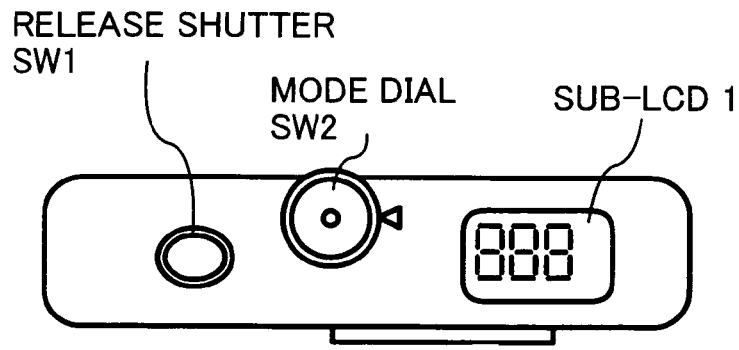
FIGS. 1A to 1C are a view showing an outer appearance of a digital camera according to an embodiment of the present invention.
Figure 1B:
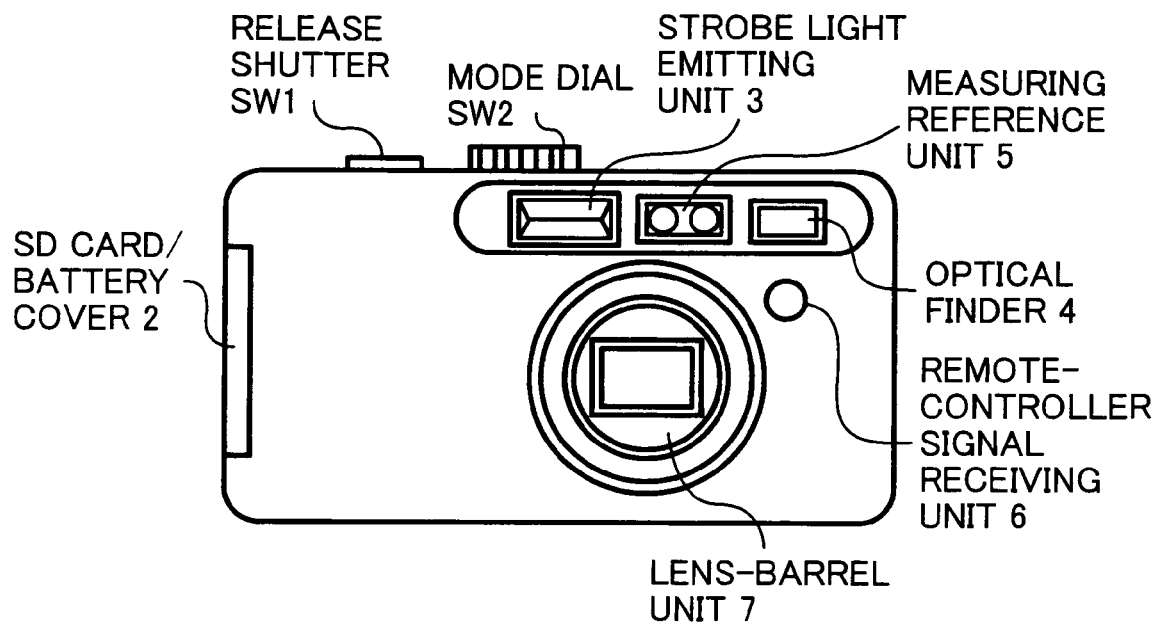
Figure 1C:
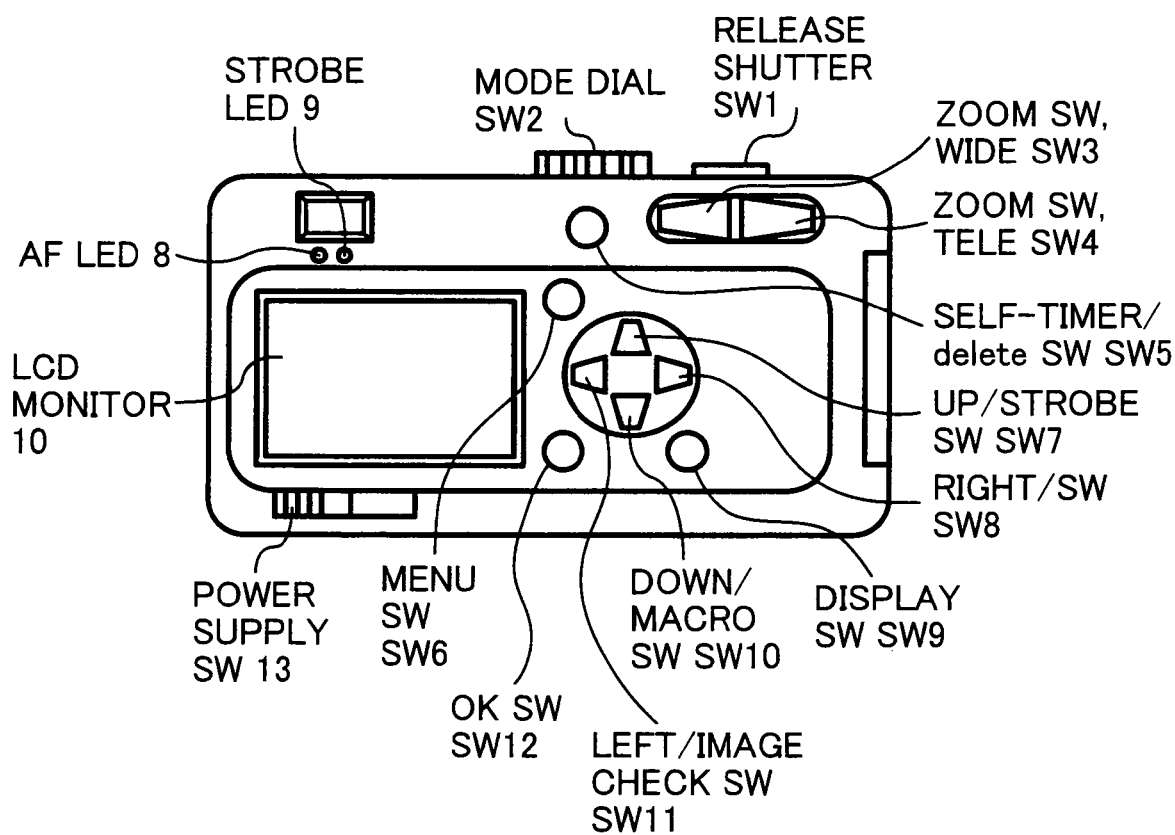

A construction of an image pickup apparatus employing a wireless communication apparatus according to the present invention, for example, a digital camera is described with reference to FIGS. 1 and 2 (2A, 2B).

Figure 2B:
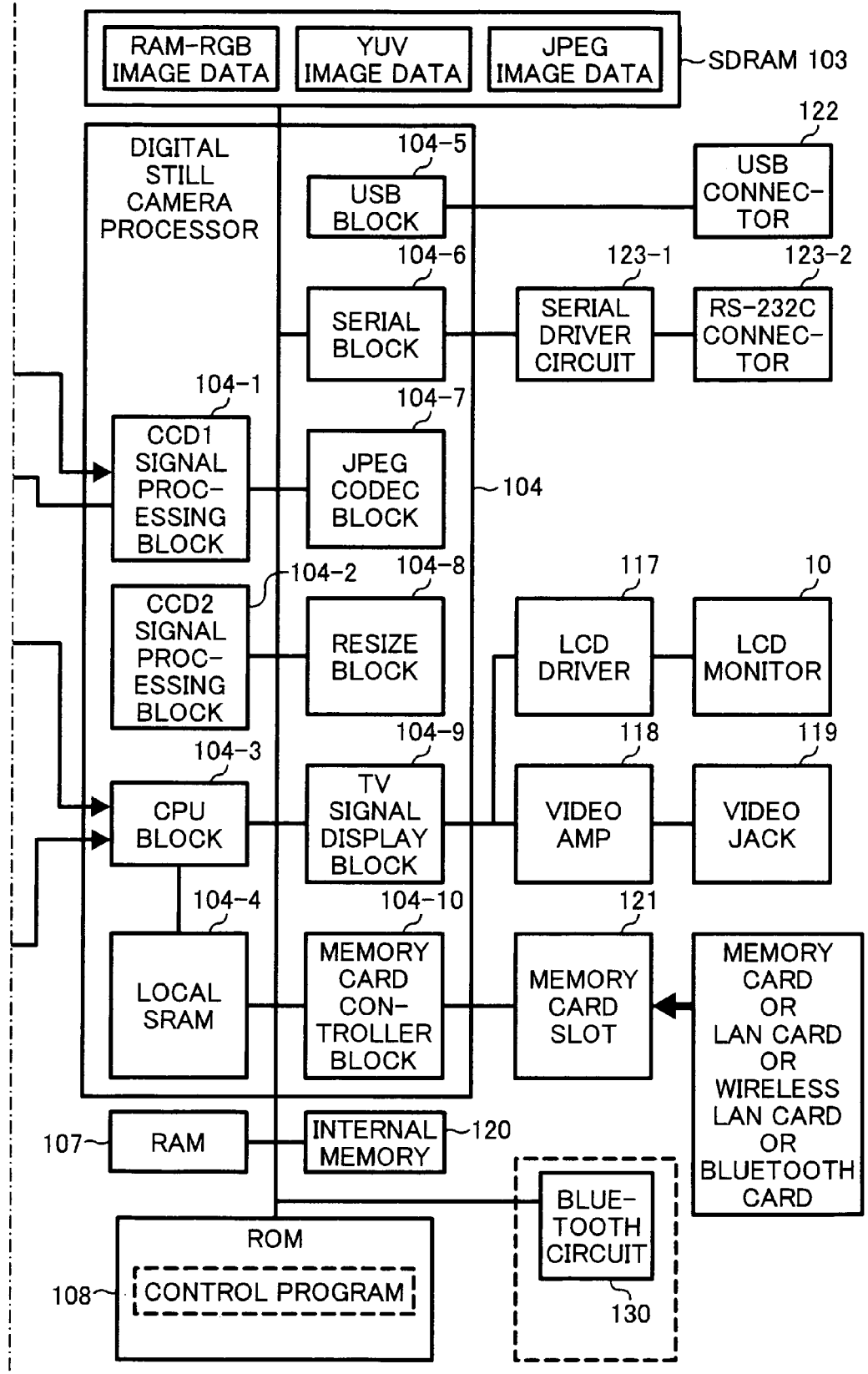
FIG. 2 (2A, 2B) is a block diagram showing a control configuration of the digital camera.

As shown in FIGS. 1 and 2 (2A, 2B), a lens-barrel unit 7 includes a zoom optic system 7-1 having a zoom lens 7-1a which receives an optical image of an object and a zoom driving motor 7-1b, a focus optic system 7-2 having a focus lens 7-2a and a focus driving motor 7-2b, an aperture stop unit 7-3 having an aperture stop 7-3a and an aperture stop motor 7-3b, a mechanical shutter unit 7-4 having a mechanical shutter 7-4a and a mechanical shutter motor 7-4b, and a motor driver 7-5 which drives motors.

The motor driver 7-5 is driven and controlled by a driving command from a CPU block 104-3 in the later-described digital still camera processor 104 based on an input of a remote-controller signal receiving unit 6 or a manipulation input of manipulation Key units SW1 to SW13.

The ROM (Read-Only Memory) 108 stores control programs written by codes which can be decoded by the CPU (Central Processing Unit) block 104-3 or parameters used for controlling. When the digital camera is powered on, the program is loaded on a main memory (not shown), and the CPU block 104-3 controls operations of the units of the apparatus according to the program and temporarily stores data needed for controlling in the RAM (Random-Access Memory) 107 and a Local SRAM (Static Random Access Memory) 104-4 in later-described digital still camera processor 104. A rewritable lash memory is used for the ROM 108, so that the control program or the parameters for controlling can be changed. Therefore, version-up of felons can be easily performed.

The CCD (Charge Coupled Device) 101 is a solid state image pickup device for elecro-optically converting the optical image, and the F/E-IC (Front End Integrated Circuit) 102 includes a CDS (Correlation Double Sampling) circuit 102-1 for performing correlation double sampling used to remove image noise, an AGC (Automatic Gain Control) 102-2 for performing gain adjusting, an A/D (Analog-to-Digital) converter 102-3 for performing digital signal conversion, a CCD 101 which is supplied with a vertical synchronization signal (hereinafter, referred to as a VD) and a horizontal synchronization signal (hereinafter, referred to as an SD) from a CCD 1 control block 104-1 and controlled by the CPU block 104-3, and a TG (Timing Generator) 102-4 for generating a driving timing signal for the F/E-IC 102.

The digital still camera processor 104 includes a CCD1 control block 104-1 which performs white balance setting and gamma setting on output data for the F/E-IC 102 from the CCD 101 and supplies the aforementioned the VD signal and the HD signal, a CCD2 control block 104-2 which performs conversion to luminance data and color difference data by using a filtering process, a CPU block 104-3, which controls the aforementioned units of the apparatus, a Local SRAM 104-4 which temporarily stores data needed for the aforementioned controlling, a USB block 104-5 which constructs USB communication to an external apparatus such as a PC, a serial block 104-6 which constructs serial communication to the external apparatus such as the PC. a JEPG CODEC block 104-7 which performs JPEG compression and decompression, a resize block 104-8 which magnifies and reduces a size of the image data by using an interpolation process, a TV signal display block 104-9 which converts the image data to video signals to display the image on an external display apparatus such as LCD monitor or TV, a memory card block 104-10 which controls a memory card for storing the pick-up image data.

The SDRAM 103 temporarily stores the image data when the image data are subjected to various processes in the aforementioned digital still camera processor 104. The stored image data are input from the CCD 101 via the F/E-IC 102 and include "RAW-RGB image data" which are subjected to the white balance setting in the CCD1 signal processing block 104-1, "YUV image data" which are subjected to the luminance data conversion and the color difference data conversion in the CCD2 control block 104-2, "JPEG image data" which are subjected to the JPEG compression in the JPEG CODEC block 104-7, and the like.

The memory card slot 121 is used to mount a detachable memory card. In addition to the memory card, the memory card slot 121 may be used to mount an IO card such as detachable IAN card, wireless LAN card, and Bluetooth card. The picked-up image can be transmitted to the external apparatus via the IO card.

The Bluetooth circuit 130 is a wireless communication circuit for performing the wireless communication to the external apparatus, so that the picked-up image can be transmitted to the external apparatus via the Bluetooth circuit 130.

The internal memory 120 is a memory capable of storing the picked-up image even though the memory card is not mounted in the aforementioned memory card slot 121.

The LCD driver 117 is a drive circuit which drives the later-described LCD monitor 10 and also have a function of converting the video signals output from the TV signal display block 104-9 to signals used to display the image on the LCD monitor 10.

The LCD monitor 10 is a monitor used to monitor a state of the object before the image pickup and check the picked-up image, and display the image data recorded in the memory card or the internal memory 120.

The video AMP 118 is an amplifier used to perform 750 impedance transformation on the video signal output from the TV signal display block 104-9, and the video jack 119 is a jack used for connection to the external apparatus such as a TV set.

The USB connector 122 is a connector used for USB connection to the external apparatus such as a PC.

The serial driver circuit 123-1 is a circuit for performing voltage conversion on the output signal of the aforementioned serial block 104-6 in order to perform serial connection to the external apparatus such as a PC, and the RS-232C connector is a connector used for connection to the external apparatus such as a PC.

The sub-CPU 109 is a CPU with built-in ROM and RAM in a form of one chip and has a function of outputting the output signals of the manipulation Key units SW1 to SW13 or the remote-controller signal receiving unit 6 as user's manipulation information to the aforementioned CPU block 104-3 or converting the camera state output from the aforementioned CPU block 104-3 to control signals for the later-described sub-LCD 1, AF LED 8, strobe LED 9, and buzzer 113.

The sub-LCD 1 is a display unit for display, for example, a pickup available number, and the LCD driver 111 is a driver circuit for driving the aforementioned sub-LCD 1 according to the output signal of the aforementioned sub-CPU 109.

The AF LED 8 is an LED used to indicate a focusing state at the time of image pickup, and the strobe LED 9 is an LED used to indicate a strobe charging state. The AF LCD 8 and the strobe LED 9 may be used to indicate "during memory card access" or used for other purposes.

The manipulation key units SW1 to SW13 are key circuits which are manipulated by the user, and the remote-controller signal receiving unit 6 is a unit for receiving a signal of a remote-controller signal transmitting unit which manipulated by the user.

The audio recording unit 115 include a microphone 115-3 through which the user inputs an audio signal, a microphone AMP 115-2 which amplifies the input audio signal and an audio recording circuit 115-3 which records the amplified audio signal.

The audio reproducing unit 116 includes an audio reproducing circuit 116-1 which converts the recorded audio signal to a signal which can be output though a speaker, an audio AMP 116-2 which amplifies the converted audio signal to drive the speaker, and the speaker 116-3 which outputs the audio signal.

Next, a PDA (Personal Digital Assistant) information terminal apparatus as an example of the image pickup apparatus is described with reference to FIG. 3.

Figure 3:
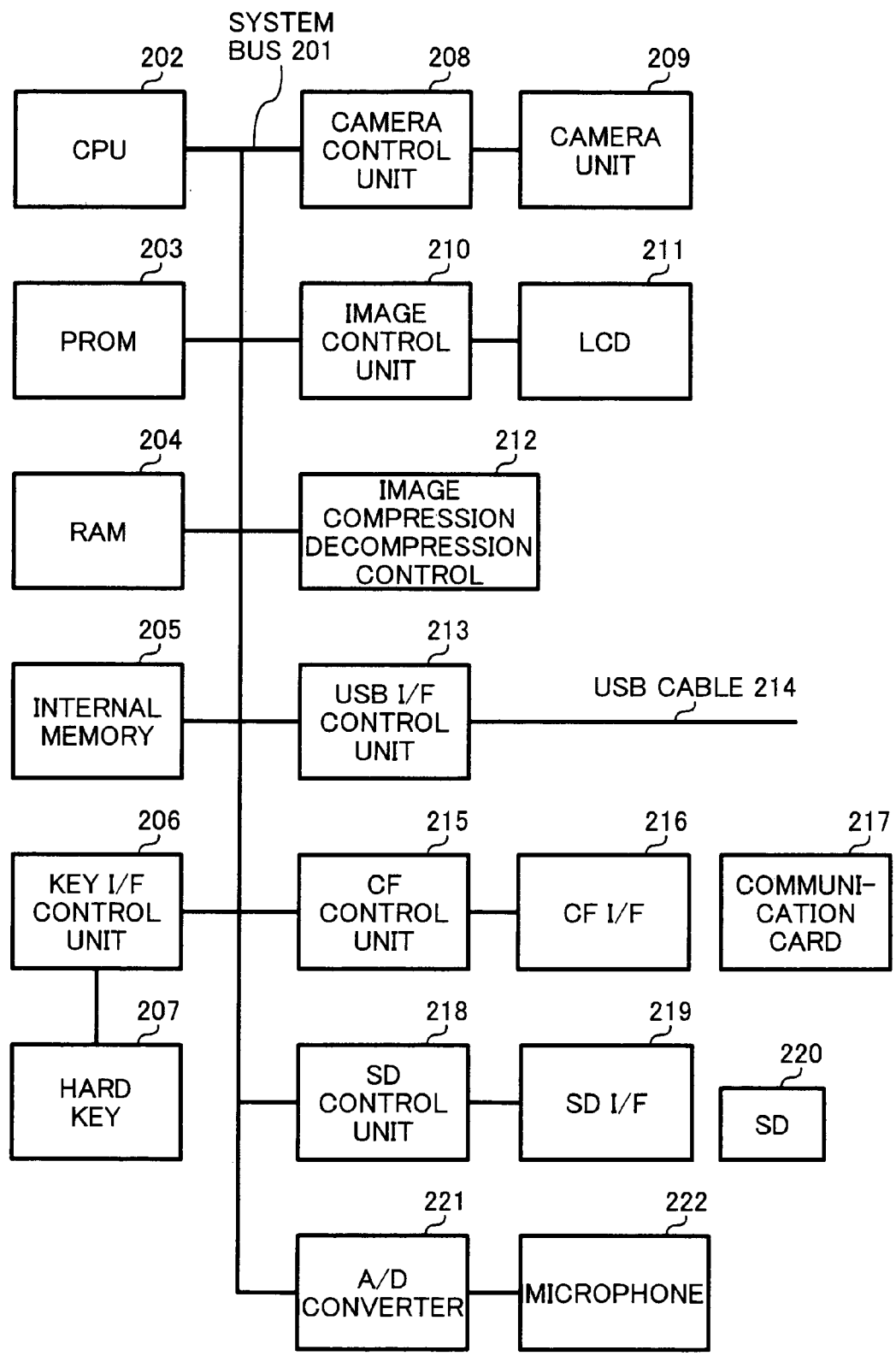
FIG. 3 is a block diagram showing a construction of a PDA according to an embodiment of the present invention.

The PDA information terminal apparatus shown in FIG. 3 includes a system bus 201, a CPU 202, a PROM 203 for storing the program, a RAM 204 which is a work region for the program or data, an internal memory 205 for storing picked-up image files, system file, or data file, a KEY I/F interface control unit 206 for detecting hard keys, hard keys 207 such as a shutter key or zoom key, a camera unit 209, a camera control unit 208 for controlling the camera unit 209, an image compression decompression control unit 212 for compressing the image input from the camera unit 208 into JPEG data or decompressing the JPEG data stored in the memory, an image control unit 210 for output an image data from the camera control unit 208 or the image data from the image compression decompression control unit 212 as an image signal on an LCD unit 211. a USB I/F control unit 213, a USB cable 214 for connection to a printer apparatus or the like, a CF (Compact Flash) control unit 215, a CF I/F 216, a communication card 217 inserted into the CF I/F 216, an SD control unit 218, an SD I/F 219, an SD card 220 inserted into the SD I/F 219, a microphone 222, and an A/D converter 221 for converting an analog audio signal from the microphone to a digital signal.

In general, the image pickup starts with the hard key 207. The image is input into the camera unit 209. The image control unit 210 converts the image signal output from the camera unit 209 to frame data such as RGB data and YCbCr data and performs predetermined processes, and after that, transmitted the image data to the RAM 204. The transmitted image data is compressed into image data such as JEPG data in the image compression decompression control unit 212 and transmitted to the RAM 204. The image data such as the JEPG data stored in the RAM 204 is subjected to a predetermined header process, and after that, recorded in the internal memory 205 or the SD card 220 through the SD control unit 218.

In comparison with the aforementioned digital camera shown in FIGS. 1 and 2 (2A, 2B), in the PDA information terminal apparatus shown in FIG. 3, the lens-barrel unit 7 corresponds to the camera unit 209, the F/E (Front End)-IC 102 including the CCD 101 corresponds to the camera control unit 208, the CCD1 control block 104-1 and the CCD2 control block 104-2 correspond to the image control unit 210, the internal memory 120 corresponds to the internal Memory 205. The camera function sections of the aforementioned PDA information terminal apparatus shown in FIG. 3 may have lower performance than that of the digital camera apparatus shown in FIG. 2 (2A, 2B), but the basic functions are the same.

The embodiment of the present invention can be employed by a digital camera apparatus, a PDA information terminal, apparatus or other apparatuses having basic camera functions or wireless communication functions.

Next, a protocol stack is described.

The digital camera shown in FIG. 2 (2A, 2B) performs Bluetooth communication by using a Bluetooth card inserted into the memory card slot 121 or using the Bluetooth circuit 130.

Figure 4:
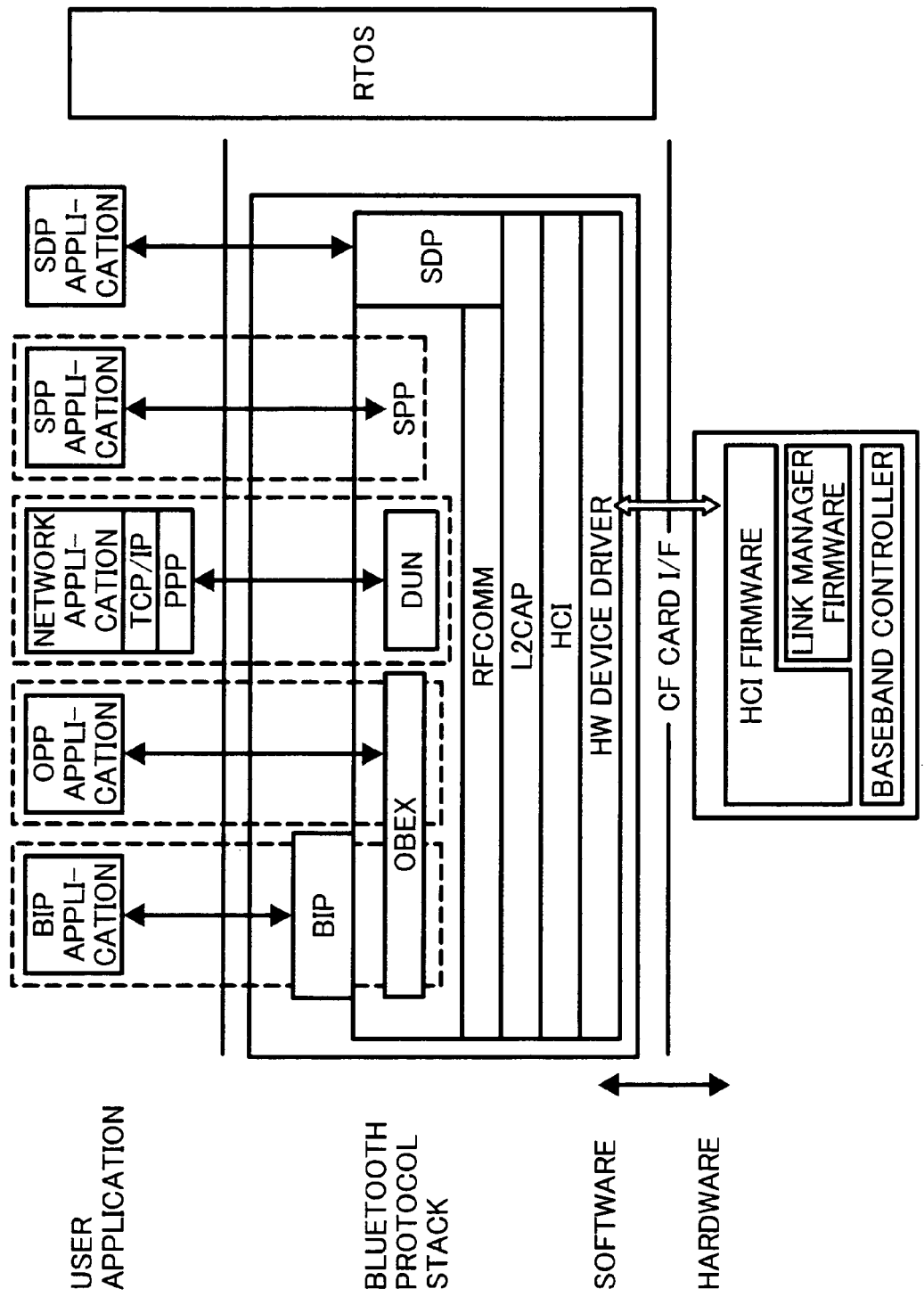
FIG. 4 is a view showing a Bluetooth protocol stack structure.

FIG. 4 shows a Bluetooth protocol stack structure according to the present invention.

The Bluetooth protocol stack of the apparatus side includes a HW device driver for directly controlling hardware (HW), an HCI (Host Controller Interface) for controlling communication between a host and a host controller, an L2CAP (Logical Link Control and Adaptation Protocol) or performing logic channel setting and dividing and assembling layer packets, an RFCOMM for converting a protocol of the Bluetooth wireless communication to I/F (interface) such as RS232C, an OBEX (Object Exchange) for transmitting and receiving data (object), an SDP (Service Discovery Protocol) for searching services of the Bluetooth apparatuses, a DUN (Dial Up Network) for implementing dial up communication, a BIP (basic Image Protocol) for transmitting and receiving an image, an SPP (Serial Port Profile) for implementing serial communication, a BIP application for controlling the BIP to implement image transmission and reception, an OPP application for controlling the OBEX to implement file transmission and reception, a network application for controlling the DUN to implement dial up communication, an SPP application for controlling the SPP to implement serial communication, an SDP application for controlling the SDP to perform Bluetooth apparatus searching.

The Bluetooth card connected through the CF car I/F includes HCI firmware or controlling the communication between the host and the host controller, link manager firmware for controlling connection establishment between the Bluetooth apparatuses, and a baseband controller for connecting physical sections to the Bluetooth.

Figure 5:
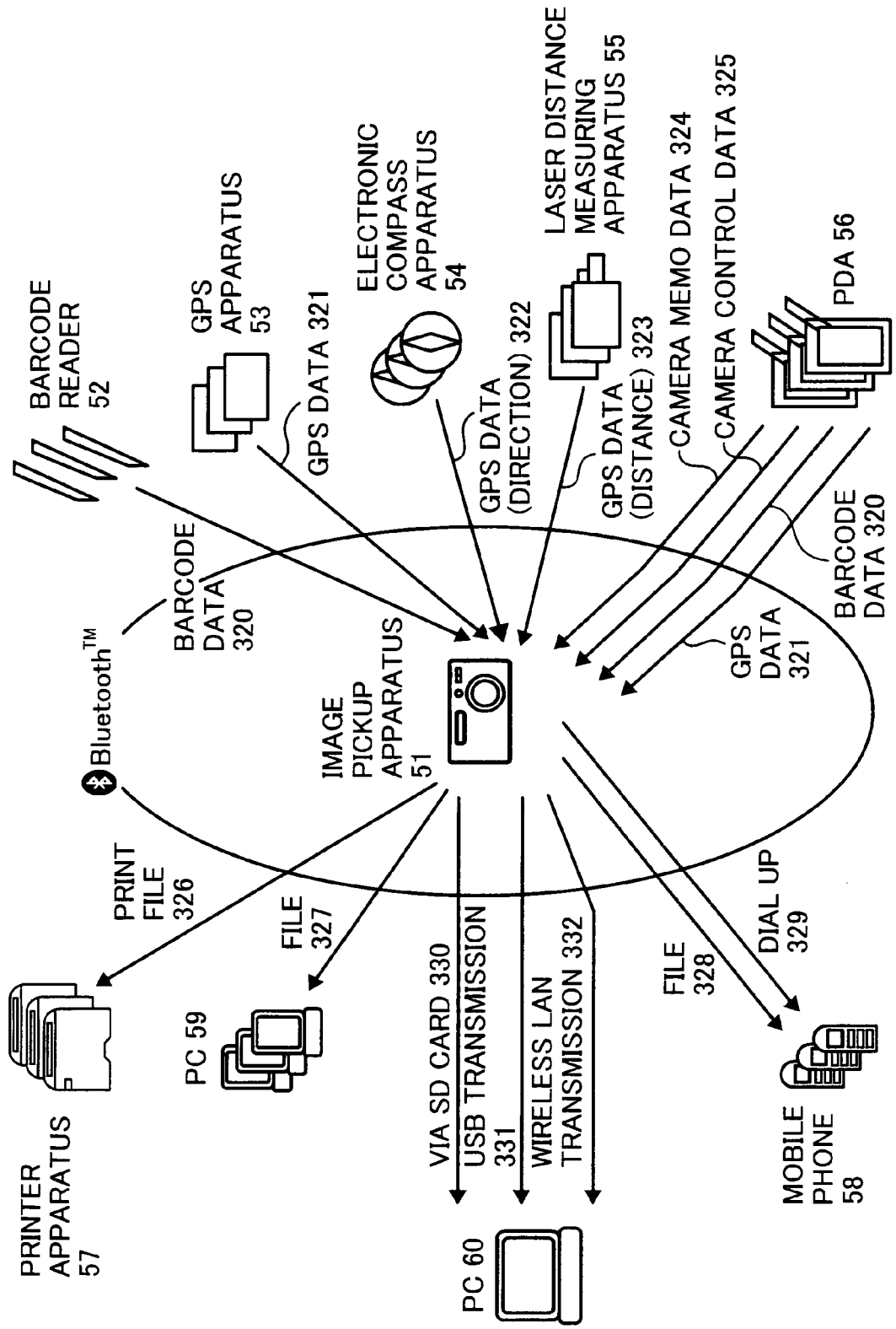
FIG. 5 is a view showing connection with Bluetooth apparatuses.

FIG. 5 is a connection diagram for the Bluetooth apparatus According to the embodiment.

The image pickup apparatus (image pickup terminal apparatus) 51 such as the digital camera apparatus described above with reference to FIGS. 1 and 2 (2A, 2B) or the PDA information terminal apparatus described above with reference to FIG. 3 can be connected to a barcode reader 52, GPS (Global Positioning System) apparatus 53, an electronic compass 54, and a laser distance measuring apparatus 55, and a PDA 56 through Bluetooth SPR. In addition, the image pickup apparatus 51 can be connected to a printer 57 through Bluetooth BIP. In addition, the image pickup apparatus 51 can be connected to a mobile phone 58 and a PC (Personal Computer) 59 through Bluetooth OPP. In addition, the image pickup apparatus 61 can be connected to the mobile phone 58 through Bluetooth DUN.

The image pickup apparatus 51 has a function as a wireless communication terminal which can be connected to various Bluetooth apparatuses in wireless communication.

The barcode reader 52 transmits barode data 320 to the image pickup apparatus 51. The GPS apparatus 53 transmits GPS data 321 to the image pickup apparatus 51. The electronic compass 54 transmits direction data 22 in the GPS data to the image pickup apparatus 51. The laser distance measuring apparatus 55 transmits distance data 23 in the GPS data to the image pickup apparatus 51. The PDA 56 transmits camera memo data 324, camera control data 325, barcode data 320, GPS data 321 to the image pickup apparatus 51. The printer 57 prints out a print file 326 transmitted from the image pickup apparatus 51. A file 328 and a dial up 329 are transmitted from the image pickup apparatus 51 to the mobile phone 58, so that file transmission or dial up communication can be performed. The file 327 is transmitted from the image pickup apparatus 51 to the PC 59, so that file transmission can be performed.

The image pickup apparatus 51 can be simultaneously connected to the barcode reader 52, the GPS apparatus 53, the electronic compass 54, the laser distance measuring apparatus 55, the PDA 56, the printer 57, the mobile phone 58, and the PC 69. In addition, the image pickup apparatus 51 can be simultaneously connected to a plurality of the barcode reader 52, a plurality of the GPS apparatus 53, a plurality of the electronic compass 54, a plurality of the laser distance measuring apparatus 55, a plurality of the PDA 56, a plurality of the printer 57, a plurality of the mobile phone 58, and a plurality of the PC 59.

The received barcode data 320, GPS data 321, GPS direction data 322, GPS distance data 323, and camera memo data 324 may be associated as annexed information with a picked-up image or combined with image data in the image pickup apparatus 51. The received camera control data 325 is used to remote-control a behavior of the image pickup apparatus 51.

The barcode data 320, the GPS data 321, the GPS direction data 322, the GPS distance data 323, and the camera memo data 324 as the annexed information associated with the picked-up image are transmitted from the image pickup apparatus 51 to the PC 60 which is an external apparatus via a SD card 330, a USB 331, or a wireless LAN 332.

The picked-up image transmitted from the image pickup apparatus 51 is managed by the PC 60 in a firm that the image is associated with the barcode data 320, the GPS data 321, the GPS direction data 322, the GPS distance data 323, and the camera memo data 324.

Figure 6:
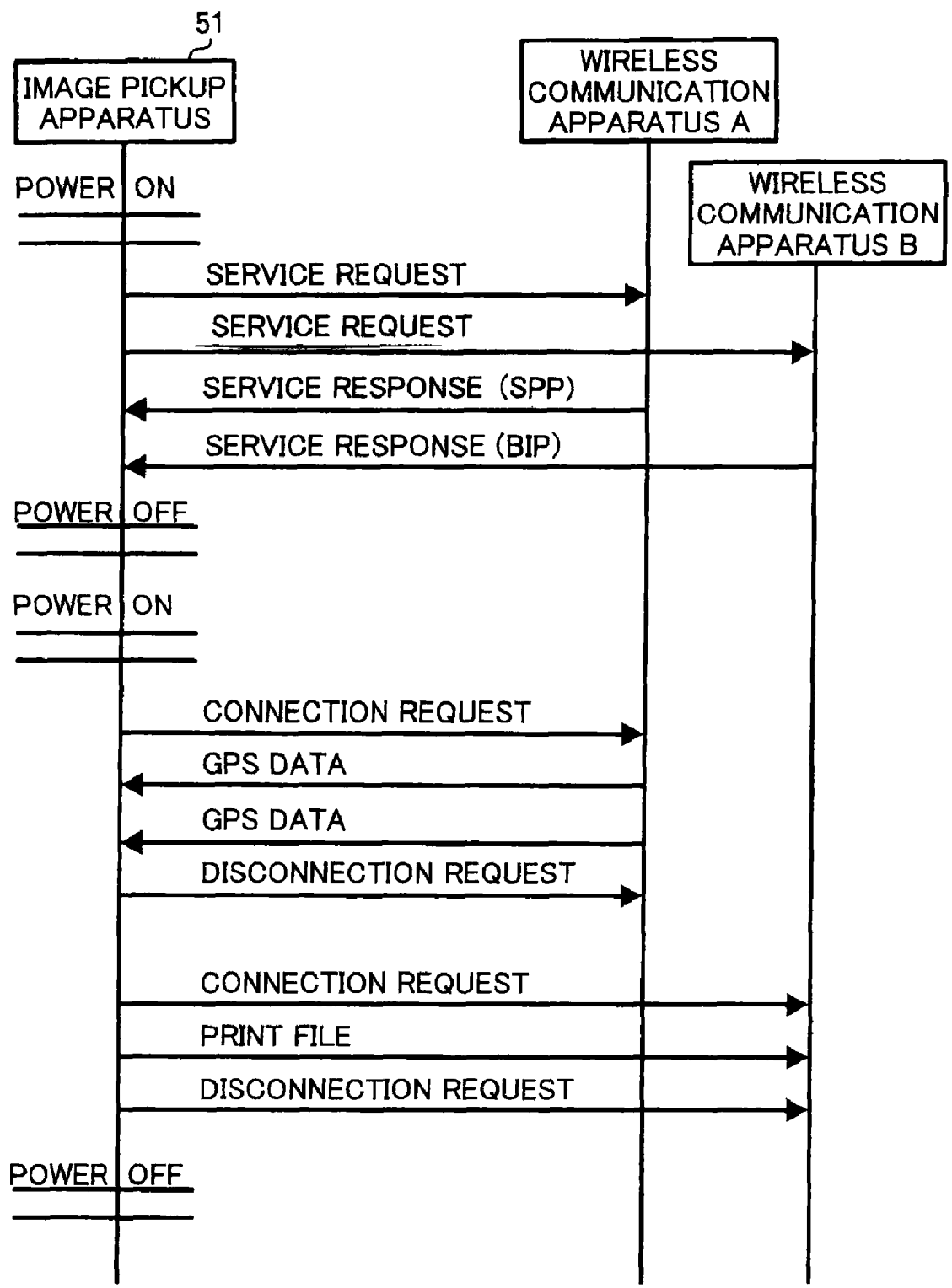
FIG. 6 is a sequence diagram showing a connection process or Bluetooth apparatuses.

FIG. 6 is a connection sequence diagram of the Bluetooth apparatus According to the embodiment.

When powered on, the image pickup apparatus 51 performs a service searching process for peripheral apparatuses. In the service searching process, address information of the peripheral apparatuses or the corresponding protocols and functions are identified. The image pickup apparatus 51 automatically generates an address list or the like by using the information and registers the address list in the system. In the sequence, it can be identified that a wireless communication apparatus A (an example of the peripheral apparatuses) is an apparatus corresponding to the Bluetooth SPP and a wireless communication apparatus B (an example of the peripheral apparatuses) is an apparatus corresponding to the Bluetooth BIP. The service searching process may be performed multiple times.

Once the service searching process is performed, the address list of peripheral apparatuses is generated. Therefore, a user can perform a connection process for an arbitrary apparatus recorded in the address list. In the sequence, since the wireless communication apparatus A is identified as the apparatus corresponding to the Bluetooth SPP, the connection process for the Bluetooth SPP is performed. After the connection, the GPS data is transmitted from the wireless communication apparatus A, the image pickup apparatus 61 receives the GPS information and performs predetermined processes. As needed, the image pickup apparatus 51 may perform a connection process for the Bluetooth SPP.

In addition, since the wireless communication apparatus B is identified as the apparatus corresponding to the Bluetooth BIP, the connection process for the Bluetooth BIP is performed. After the connection, the picked-up image as the print file is transmitted from the image pickup apparatus 51 to the wireless communication apparatus B. The received print file is subjected to predetermined processes such as printing out to the wireless communication apparatus B. After completion of the print file, the disconnection process for the Bluetooth BIP is performed.

First Embodiment

Now, examples of operations in wireless communication schemes according to the embodiments of the present invention are described.

Firstly, a first embodiment is described. The first embodiment relates to an image pickup terminal apparatus which has a wireless communication function, an outer appearance shown in FIGS. 1A to 1C, a construction shown in a block diagram of FIG. 2 (2A, 2B) or 3, and a protocol stack shown in FIG. 4. In addition, the embodiment relates to a wireless communication system which performs service searching communication shown in FIG. 6 with peripheral apparatuses having the wireless communication function such as the barcode reader 52, the GPS apparatus 53, the electronic compass 54, the laser distance measuring apparatus 55, the PDA 56, the printer 57, the mobile phone 58, and the PC 59 shown in FIG. 5 and, after that, performs wireless communication with a plurality of the peripheral apparatuses to exchange information therebetween.

Figure 7:
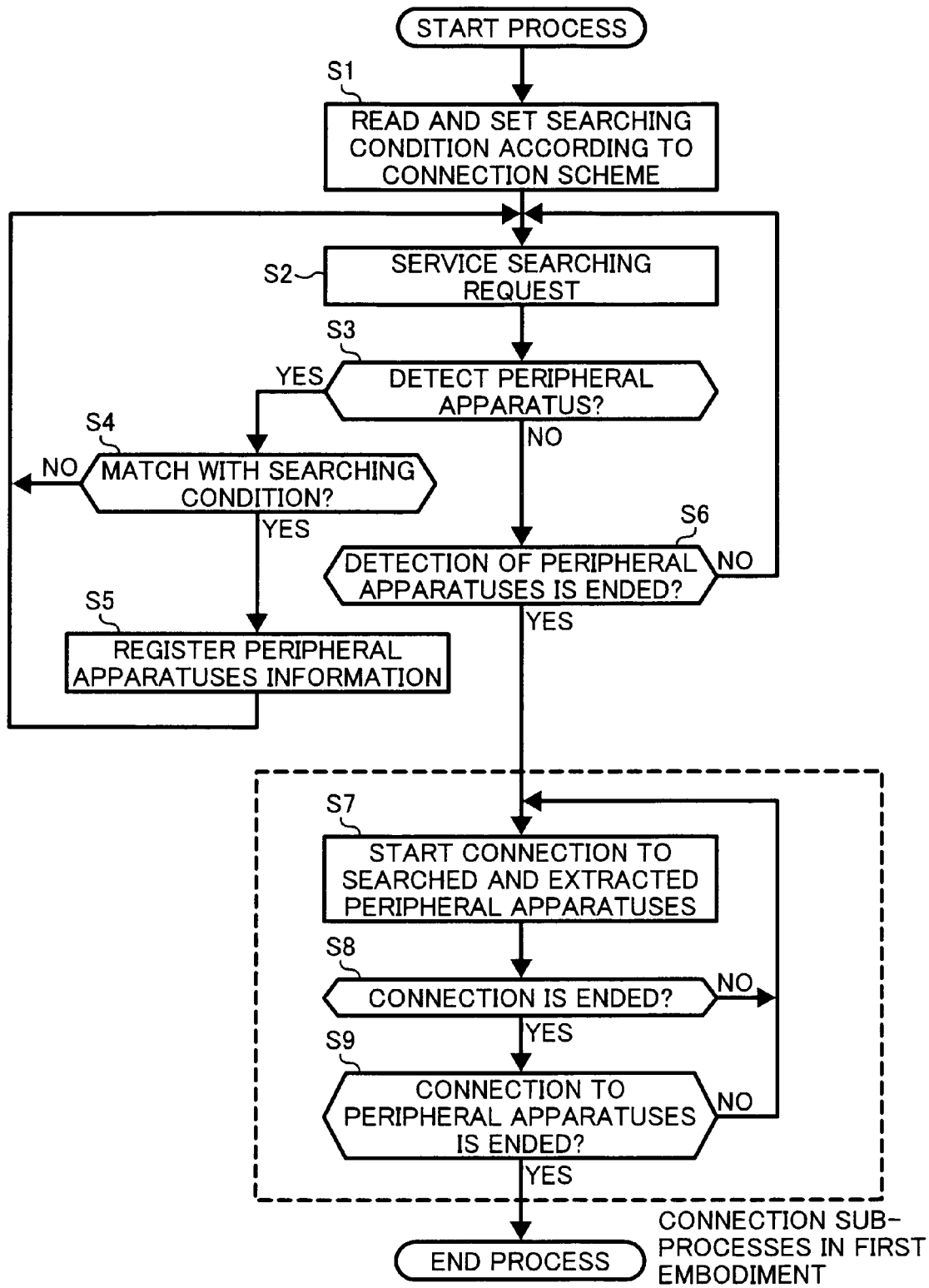
FIG. 7 is a flowchart showing an example of operations according to a first embodiment.

FIG. 7 is a flowchart showing an example of operations according to the first embodiment.

Firstly, a searching condition according to a connection scheme for a to-be-searched peripheral apparatus is set (Step S1). As an example of the searching condition, the Bluetooth SPP shown in the Bluetooth apparatus connection diagram of FIG. 5 is set. As a searching condition setting method, a user may select and input the condition by using a manipulation input unit such as manipulation keys based on contents displayed on a display unit such as an LCD monitor, and various methods may be used.

Next, the connection request transmitting source apparatus transmits a service searching request to the peripheral apparatuses (Step S2) and waits for detection of peripheral apparatuses. When a peripheral apparatus is detected (Step S3: Yes), it is determined whether or not the detected peripheral apparatus matches with the set searching condition. If the peripheral apparatus matches with the searching condition (Step S4: Yes), the address information of the detected peripheral apparatus is stored in a storage unit such as an internal memory in a form that the information is associated with identification information (name or identification number of apparatus) which can identify the detected peripheral apparatus, the detected peripheral apparatus is registered as a search-hit apparatus in the system (Step S5).

After the one peripheral apparatus is determined, the service searching request is transmitted through searching communication, and detection of peripheral apparatuses is waited for (Steps S2 to S5). The searching communication process repeats until the detection of peripheral apparatuses is completed, so that only the peripheral apparatuses matching with the searching condition are extracted (Step S6).

The connection request transmitting source apparatus performs a connection establishment process on the extracted peripheral apparatuses (Steps S7 and S8). After all the connection processes on the extracted peripheral apparatuses are completed, the processes end (Step S9).

By performing the aforementioned processes, as described in the examples of the apparatuses shown in FIG. 5, the image pickup apparatus 51, that is, the connection request transmitting source apparatus can be easily connected to a plurality of the wireless communication apparatuses such as the barcode reader 52, the GPS apparatus 53, the electronic compass 54, the laser distance measuring apparatus 65, and the PDA 56 which have communication type of performing communication at all time based on the connection conditions according to the connection schemes.

In the system according to the first embodiment, the image pickup terminal apparatus having the wireless communication function performs the service searching communication to the peripheral apparatuses having the wireless terminal function and, at that, performs the wireless communication to a plurality of the peripheral apparatuses to exchange information therebetween, and the searching condition according to the connection schemes for the to-be-searched peripheral apparatuses are set. The service searching communication is performed according to the set searching condition, so that only the peripheral apparatuses matching with the seal condition are extracted. The connection process is performed on all the extracted peripheral apparatuses. By performing the aforementioned processes, as described in the examples of the apparatuses shown in FIG. 5, the image pickup apparatus 51 can be easily connected to a plurality of the wireless communication apparatuses such as the barcode reader 52, the GPS apparatus 53, the electronic compass 54, the laser distance measuring apparatus 55, and the PDA 56 which have communication type of performing communication at all time.

According to the embodiment, in communication environment where peripheral apparatuses having various functions exist, connection to the peripheral apparatuses can be easily performed according to the connection schemes for the associated purposes.

Second Embodiment

Next, a second embodiment is described. The second embodiment relates to an image pickup terminal apparatus which has a wireless communication function, an outer appearance shown in FIG. 1A, a construction shown in a block diagram of FIG. 2 (2A, 2B) or 3, and a protocol stack shown in FIG. 4. In addition, the embodiment relates to a wireless communication system which performs service searching communication shown in FIG. 6 with peripheral apparatuses having the wireless communication function such as the barcode reader 52, the GPS apparatus 53, the electronic compass 54, the laser distance measuring apparatus 55, the PDA 56, the printer 57, the mobile phone 58, and the PC 59 shown in FIG. 5 and, after that, performs wireless communication with a plurality of the peripheral apparatuses to exchange information therebetween.

Figure 8:
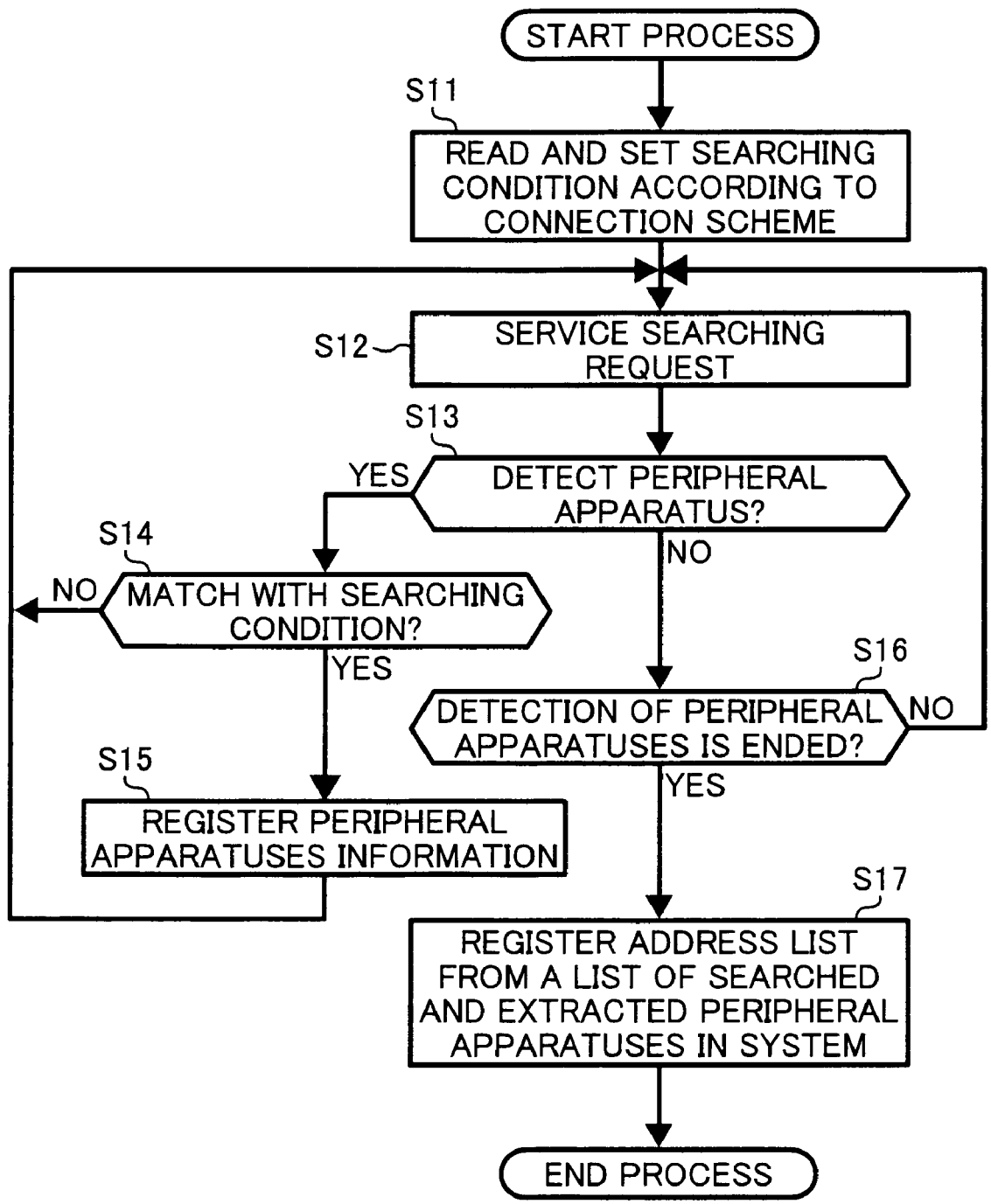
FIG. 8 is a flowchart showing an example of operations according to a second embodiment.

FIG. 8 is a flowchart showing an example of operations according to the second embodiment.

Firstly, a searching condition according to a connection scheme for a to-be-searched peripheral apparatus is set (Step S11). As an example of the searching condition, the Bluetooth SPP shown in the Bluetooth apparatus connection diagram of FIG. 5 is set. As a searching condition setting method, a user may select and input the condition by using a manipulation input unit such as manipulation keys based on contents displayed on a display unit such as an LCD monitor, and various methods may be used.

Next, the connection request transmitting source apparatus transmits a service searching request to the peripheral apparatuses (Step S12) and waits for detection of peripheral apparatuses. When a peripheral apparatus is detected (Step S13: Yes), it is determined whether or not the detected peripheral apparatus matches with the set searching condition. If the peripheral apparatus matches with the searching condition (Step S14: Yes), the address information of the detected peripheral apparatus is stored in a storage unit such as an internal memory in a form that the information is associated with identification information (name or identification number of apparatus) which can identify the detected peripheral apparatus, the detected peripheral apparatus is registered as a search-hit apparatus in the system (Step S15).

After the one peripheral apparatus is determined, the service searching request is transmits through searching communication, and detection of peripheral apparatuses is waited for (Steps S12 to S15). The searching communication process repeats until the detection of peripheral apparatuses is completed, so that only the peripheral apparatuses matching with the searching condition are extracted (Step S16).

The connection request transmitting source apparatus automatically generates an address list from a list of all the extracted peripheral apparatuses and stores the address list in a storage unit such as an internal memory to register the address list in the system (Step S17).

The address list is used for connection to the peripheral apparatus which have been extracted as the peripheral apparatus matching with the searching condition. For example, an address list of which address information is stored in a storage memory in association with identification information capable of identifying the apparatus such as name of apparatus or any types capable of implementing connection may be used.

By performing the aforementioned processes, as described in the examples of the apparatuses shown in FIG. 5, the image pickup apparatus 51, that is, the connection request transmitting source apparatus can easily generate the address list having information on only the predetermined apparatuses extracted from the wireless communication apparatuses such as the barode reader 52, the GPS apparatus 63, the electronic compass 64, the laser distance measuring apparatus 55, and the PDA 56 which have communication type of performing communication at all time.

In the system according to the first embodiment, the image pickup terminal apparatus having the wireless communication function performs the service searching communication to the peripheral apparatuses having the wireless terminal function and, after that, performs the wireless communication to a plurality of the peripheral apparatuses to exchange information therebetween, and the searching condition according to the connection schemes for the to-be-searched peripheral apparatuses are set. The service searching communication is performed according to the set searching condition, so that only the peripheral apparatuses matching with the searching condition are extracted. The address list is automatically generated from a list of all the extracted peripheral apparatuses.

By performing the aforementioned processes, as described in the examples of the apparatuses shown in FIG. 5, the image pickup apparatus 51 can easily generate the address list having information on only the apparatuses extracted from the barcode reader 52, the GPS apparatus 53, the electronic compass 54, the laser distance measuring apparatus 55, and the PDA 56 which have communication type of performing communication at all time.

According to the embodiment, in communication environment where peripheral apparatuses having various functions exist, extraction of the peripheral apparatuses matching with the searching condition can be easily extracted from communicatable peripheral apparatuses based on the searching condition.

Third Embodiment

Next, a third embodiment is described.

Figure 9:
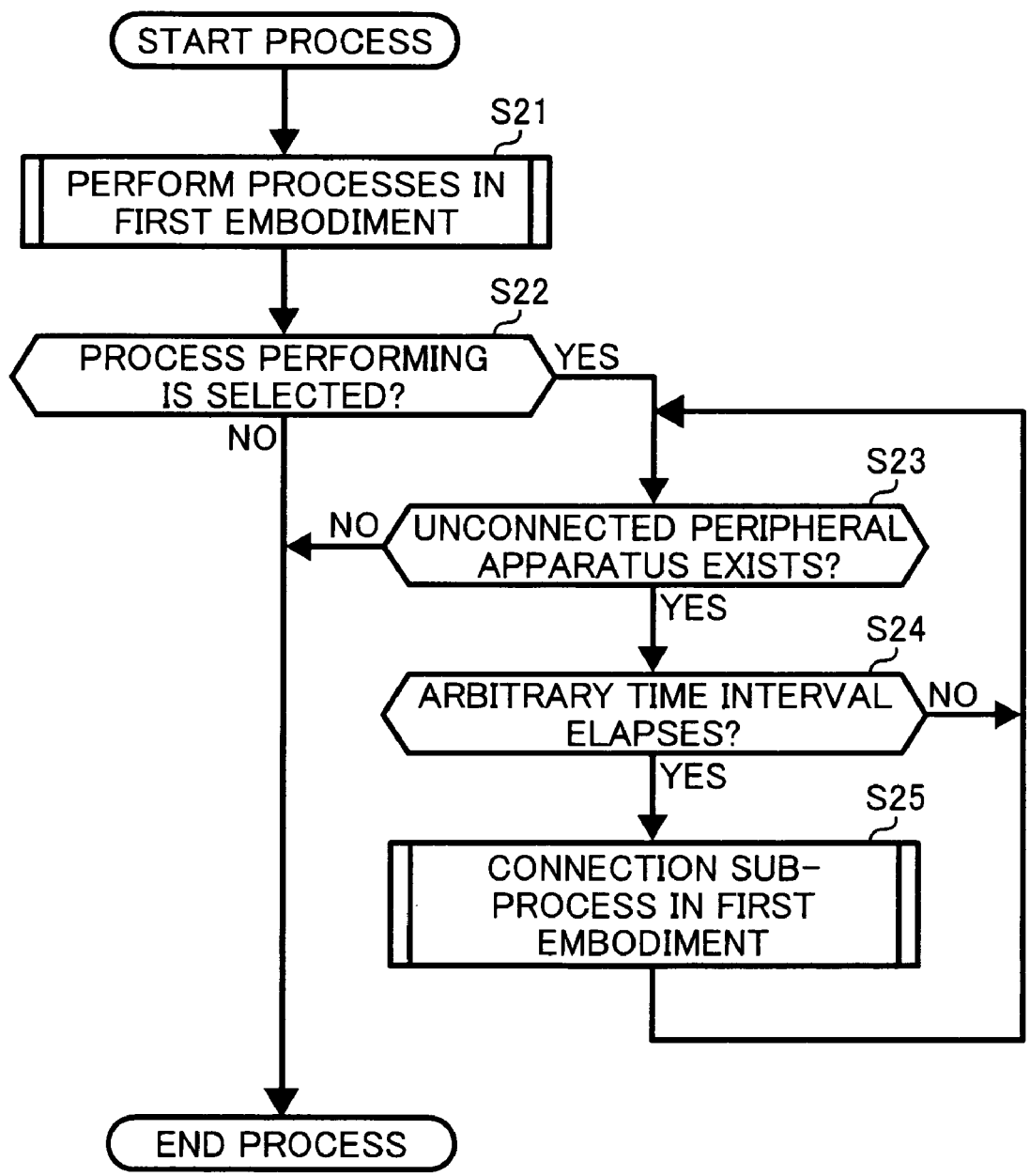
FIG. 9 is a flowchart showing an example of operations according to a third embodiment.

FIG. 9 is a flowchart showing an example of operations according to the third embodiment.

In the third embodiment, at the time of starting the system according to the first or second embodiment (at the time of starting the image pickup terminal apparatus), a user is allowed to set whether or not the process according to the first embodiment is performed.

In addition, in a case where the process according to the first embodiment is performed periodically on a predetermined time period) is performed, at the time of staring the system, the process according to the first embodiment is performed, and after that, it is determined whether or not all the peripheral apparatuses matching with the searching condition among the peripheral apparatuses registered in the address list according to the second embodiment are connected (Steps S21 to S23). Namely, it is determined whether or not all the peripheral apparatuses matching with the searching condition according to the connection schemes among the peripheral apparatuses which are determined to be communicable up to now are connected.

In a case where unconnected peripheral apparatuses exist, after a predetermined time elapses (Step S24), the connection process according to the first embodiment is performed (Step S25). Next, it is determined again with reference to the address list whether or not all the peripheral apparatuses matching with the searching condition are connected (Step S23). If unconnected peripheral apparatuses exist the connection process repeats.

By performing the aforementioned processes, as described in the examples of the apparatuses shown in FIG. 5, the image pickup apparatus 51 can be easily connected to the barcode reader 52, the GPS apparatus 53, the electronic compass 54, the laser distance measuring apparatus 55, and the PDA 56 which have communication type of performing communication at all time although the apparatuses are currently powered off and later powered on.

In addition, although the aforementioned Step S25 of performing connection sub-processes (Steps S7 to S9) is described, all the processes (searching and connection processes) according to the first embodiment may be performed. Accordingly, even in a case where a new apparatus matching with the searching condition comes into a communication coverage during the periodic repetition of the connection process, the new apparatus can be extracted as an apparatus matching with the searching condition, and the connection process therefore can be performed.

According to the third embodiment, at the time of starting the system according to the first or second embodiment, the user is allowed to set whether or not the process according to the first embodiment is performed. In addition, after the process according to the first embodiment is performed, the connection process after the time of starting the system is performed periodically again until all the peripheral apparatuses matching with the searching condition among the apparatus registered in the address list is connected. By performing the aforementioned processes, as described in the examples of the apparatuses shown in FIG. 5, the image pickup apparatus 51 can be easily connected to the barcode reader 52, the GPS apparatus 53, the electronic compass 54, the laser distance measuring apparatus 55, and the PDA 56 which have communication type of performing communication at all time although the apparatuses are currently powered off and later powered on.

According to the embodiment, in communication environment where peripheral apparatuses having various functions exist, connection to the peripheral apparatuses can be easily performed according to the connection schemes for the associated purposes.

Fourth Embodiment

Figure 10:
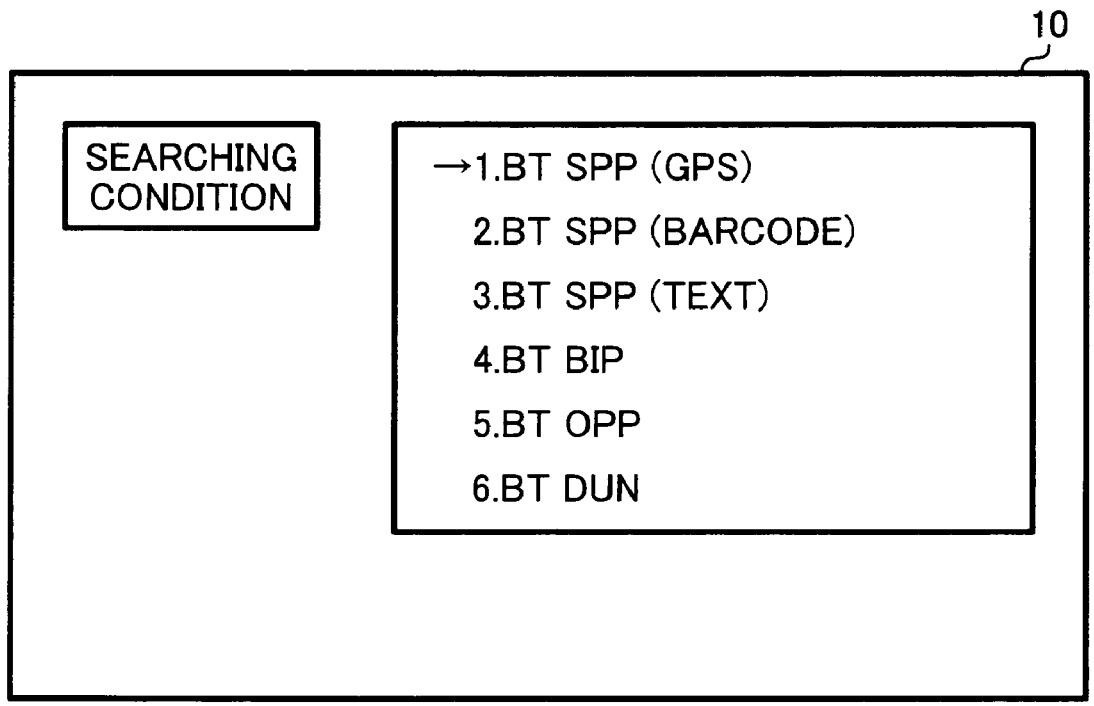
FIG. 10 is a view showing an example of a GUI screen for search condition input according to a fourth embodiment.

Next, a fourth embodiment is described. According to the fourth embodiment, a user can set the searching condition according to the connection schemes of the to-be-searched peripheral apparatuses by using GUI (Graphical User Interface) shown in FIG. 10 in the first to third embodiments.

For example, when the user selects and input "1. BT SPP (GPS)" by using a manipulation input unit such as manipulation keys on a screen shown in FIG. 10, the only the GPS apparatus 53, the electronic compass 54, the laser distance measuring apparatus 55, or the PDA 56 shown in FIG. 5 can be extracted. In addition, when the user selects and input "4. BT BIP" by using the manipulation input unit, only the barcode reader 52, the GPS apparatus 53, the electronic compass 54, the laser distance measuring apparatus 55, or the PDA 56 can be extracted.

In this manner, since the user can easily select and input the connection scheme as the searching condition, the connection process after the searching and extracting can be easily performed.

By performing the aforementioned processes, as described in the examples of the apparatuses shown in FIG. 5, in a case where the image pickup apparatus 51 is set to the GPS of the Bluetooth SPP, the image pickup apparatus 51 can be easily connected to a plurality of the wireless communication apparatuses such as the GPS apparatus 53, the electronic compass 54, the laser distance measuring apparatus 55, and the PDA 56 which have a Bluetooth SPP GPS function.

According to the fourth embodiment, it is possible to provide an interface that allows the user to set the searching condition according to the connection schemes for the to-be-searched peripheral apparatuses in the first to third embodiments.

By performing the aforementioned processes according to the embodiment, as described in the examples of the apparatuses shown in FIG. 5, in a case where the image pickup apparatus 51 is set as the GPS of the Bluetooth SPP, the image pickup apparatus 51 can be easily connected to a plurality of the wireless communication apparatuses such as the GPS apparatus 53, the electronic compass 54, the laser distance measuring apparatus 55, and the PDA 56 which have a Bluetooth SPP GPS function.

According to the embodiment, According to the embodiment, in communication environment where peripheral apparatuses having various functions exist, connection to the peripheral apparatuses can be easily performed according to the connection schemes for the associated purposes.

Fifth Embodiment

Next, a fifth embodiment is described. In the fifth embodiment, in addition to the searching condition according to the connection schemes for the to-be-searched peripheral apparatuses in the first to fourth embodiment, a wireless communication state and a peripheral apparatus extraction number are set as the extracting condition.

Figure 11:
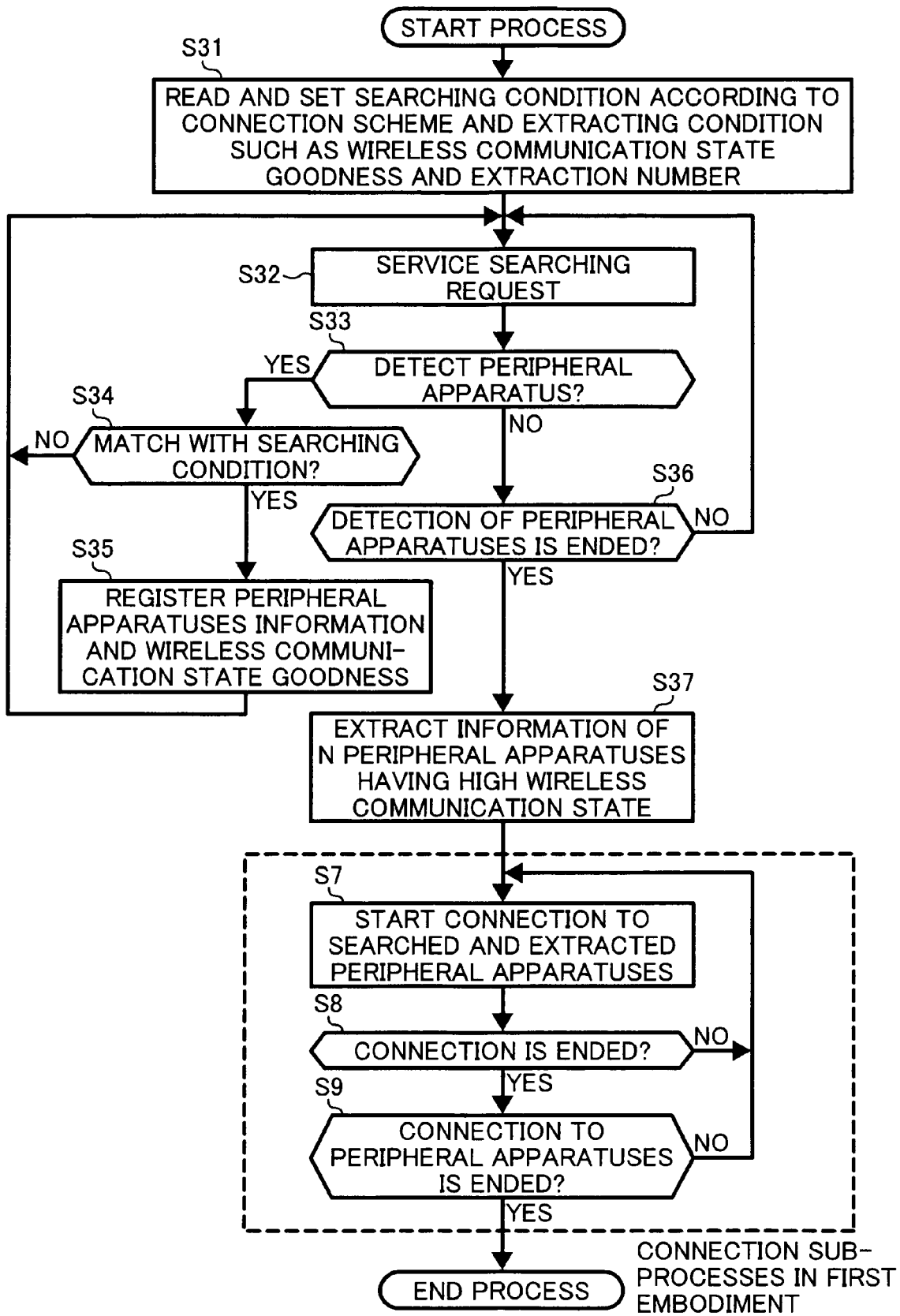
FIG. 11 is a flowchart showing an example of operations according to a fifth embodiment.

FIG. 11 is a flowchart showing an example of operations according to the fifth embodiment.

In the fifth embodiment, firstly, the extracting condition or the to-be-searched peripheral apparatuses is set (Step S31). As an example of the extracting condition, the searching condition according to the connection schemes such as the Bluetooth SPP shown in the Bluetooth apparatus connection diagram of FIG. 5, a threshold value indicating the wireless communication state used to extract only the peripheral apparatuses of which wireless communication state goodness is equal to or greater than a predetermined threshold value, and the extraction number used to define a number of to-be-extracted peripheral apparatuses wireless counted from the highest communication state goodness are set. As an extracting condition setting method, a user may select and input the condition by using a manipulation input unit such as manipulation keys based on contents displayed on a display unit such as an LCD monitor, and various methods may be used.

Next, the connection request transmitting source apparatus transmits the service searching request to the peripheral apparatuses (Step S32), and waits for detection of peripheral apparatuses. When a peripheral apparatus is detected (Step S33: Yes), it is determined whether or not the detected peripheral apparatus matches with the set searching condition. If the peripheral apparatus matches with the searching condition (Step S34: Yes), the address information of the detected peripheral apparatus and the wireless communication state goodness for the apparatus is stored in a storage unit such as an internal memory in a form that the information is associated with identification information which can identify the detected peripheral apparatus, the detected peripheral apparatus is registered as a search-hit apparatus in the system (Step S35).

After the one peripheral apparatus is determined, in addition to the searching based on the searching condition according to the connection schemes for the to-be-searched apparatuses, the wireless communication state and the peripheral apparatus extraction number are registered, and additional extraction process is performed (Steps S32 to S35). These processes repeat until the detection of peripheral apparatuses is completed, so that only the peripheral apparatuses matching with the searching condition are extracted (Step S36).

Next, the connection request transmitting source apparatus extracts the peripheral apparatuses corresponding to the extraction number (n) set as the extracting condition, sequentially counted from the highest wireless communication state goodness, among the extracted peripheral apparatuses matching with the searching condition (Step S37).

The connection request transmitting source apparatus performs a connection establishment process on the extracted peripheral apparatuses (Steps S7 and S8). After all the connection processes on the extracted peripheral apparatuses are completed, the processes end (Step S9).

By performing the aforementioned processes, as described in the examples of the apparatuses shown in FIG. 5, the image pickup apparatus 51, that is, the connection request transmitting source apparatus can be easily connected to a plurality of the wireless communication apparatuses such as the GPS apparatus 53, the electronic compass 54, the laser distance measuring apparatus 55, and the PDA 56, that is, the n or less apparatuses having high wireless communication state goodness.

As described above, in the fifth embodiment, in addition to the searching condition according to the connection schemes for the to-be-searched peripheral apparatuses in the first to fourth embodiment, a wireless communication state and a peripheral apparatus extraction number are set as the extracting condition By performing the aforementioned processes, as described in the examples of the apparatuses shown in FIG. 5, the image pickup apparatus 51 can be easily connected to a plurality of the wireless communication apparatuses such as the GPS apparatus 53, the electronic compass 54, the laser distance measuring apparatus 55, and the PDA 66, that is, the n or less apparatuses having high wireless communication state goodness.

According to the embodiment, in communication environment where peripheral apparatuses having various functions exist, connection to the peripheral apparatuses having high communication state goodness can be easily performed according to the connection schemes for the associated purposes.

In the fifth embodiment, in addition to the searching condition according to the first to fourth embodiment, both of the wireless communication state and the peripheral apparatus extraction number are set as the extracting condition, but any one thereof may be set as the extracting condition.

Namely, the searching based on the searching condition is performed, and after that, the extracting based on the extracting condition is performed to extract only the peripheral apparatuses having wireless communication equal to or greater than a predetermined threshold value. Alternatively, the peripheral apparatuses in the peripheral apparatus extraction number counted from the high wireless communication state goodness may be constructed to be extracted.

Sixth Embodiment

Next, a sixth embodiment is described. The sixth embodiment relates to an image pickup terminal apparatus which has a wireless communication function, an outer appearance shown in FIGS. 1A to 1C, a construction shown in a block diagram of FIG. 2 (2A, 2B) or 3, and a protocol stack shown in FIG. 4. In addition, the embodiment relates to a wireless communication system which performs service searching communication shown in FIG. 6 with peripheral apparatuses having the wireless communication function such as the bar-code reader 52, the GPS apparatus 53, the electronic compass 54, the laser distance measuring apparatus 55, the PDA 56, the printer 57, the mobile phone 58, and the PC 59 shown in FIG. 5 and, after that, performs wireless communication with a plurality of the peripheral apparatuses to exchange information therebetween.

FIG. 12 is a flowchart showing an example of operations according to the sixth embodiment.

Firstly, a searching condition according to a connection scheme for a to-be-searched peripheral apparatus is set (Step S41). As an example of the searching condition, the Bluetooth SPP shown in the Bluetooth apparatus connection diagram of FIG. 5 is set. As a searching condition setting method, a user may select and input the condition by using a manipulation input unit such as manipulation keys based on contents displayed on a display unit such as an LCD monitor, and various methods may be used.

Next, the connection request transmitting source apparatus transmits a service searching request to the peripheral apparatuses (Step S42) and waits for detection of peripheral apparatuses. When a peripheral apparatus is detected (Step S43: Yes), it is determined whether or not the detected peripheral apparatus matches with the set searching condition. If the peripheral apparatus matches with the searching condition (Step S44: Yes), the address information of the detected peripheral apparatus is stored in a storage unit such as an internal memory in a form that the information is associated with identification information (name or identification number of apparatus which can identify the detected peripheral apparatus, the detected peripheral apparatus is registered as a search-hit apparatus in the system (Step S45).

After the one peripheral apparatus is determined, the service searching request is transmits through searching communication, and detection of peripheral apparatuses is waited for (Steps S42 to S45). The searching communication process repeats until the detection of peripheral apparatuses is completed, so that only the peripheral apparatuses matching with the searching condition are extracted (Step S46).

At the time of starting the system, the connection request transmitting source apparatus automatically performs the aforementioned service searching communication (Steps S41 to S46). Next, a display for requesting the user to verify whether or not all the extracted peripheral apparatuses are subjected to the next processes is performed by using a display unit such as an LCD monitor (Steps S47 and S48). Next, when an input indicating that the connection process is to be performed by using a manipulation input unit such as manipulation keys (Step S48: Yes), the connection establishment process is performed (Step S49). After the verifying and connection processes on all the extracted peripheral apparatuses are completed, the processes end (Step S50).

By performing the aforementioned processes, as described in the examples of the apparatuses shown in FIG. 5, the image pickup apparatus 51 can be easily connected to a plurality of the wireless communication apparatuses such as the barcode reader 52, the GPS apparatus 53, the electronic compass 54, the laser distance measuring apparatus 55, and the PDA 56 which have communication type of performing communication at all time while allowing the user to perform the verifying.

In the system according to the first embodiment, the image pickup terminal apparatus having the wireless communication function performs the service searching communication to the peripheral apparatuses having the wireless terminal function and, after that, performs the wireless communication to a plurality of the peripheral apparatuses to exchange information therebetween, and the searching condition according to the connection schemes for the to-be-searched peripheral apparatuses are set. The service searching communication is performed according to the set searching condition, so that only the peripheral apparatuses matching with the searching condition are extracted. At the time of starting the system, the service searching communication is automatically performed. It is displayed whether or not all the extracted peripheral apparatuses are subjected to the connection process. By performing the aforementioned processes, as described in the examples of the apparatuses shown in FIG. 5, the image pickup apparatus 51 can be easily connected to a plurality of the wireless communication apparatuses such as the barcode reader 52, the GPS apparatus 53, the electronic compass 54, the laser distance measuring apparatus 55, and the PDA 56 which have communication type of performing communication at all time while receiving the input of the verifying from the user.

According to the embodiment, in communication environment where peripheral apparatuses having various functions exist, connection to the peripheral apparatuses can be easily performed according to the connection schemes for the associated purposes based on the searching condition according to the connection schemes.

The aforementioned embodiments are preferred embodiments of the present invention. Therefore, the present invention is not limited thereto, but various changes and modifications can be made within a technical spirit of the present invention.

For example, the present invention employing an image pickup terminal apparatus is described. However, any information apparatus having a wireless communication function may be employed, As an example of the information apparatus, there are a digital camera apparatus, an information terminal apparatus, a PDA, a PC, a mobile phone, and the like.

In addition, process sequences for implementing the aforementioned wireless communication apparatuses according to the embodiments may be recorded as a program in a recording medium. Accordingly, the aforementioned functions according to the embodiments of the present invention can be implemented by allowing a CPU of a computer constituting the system to execute the program recorded in the recording medium.

In this case, the present invention may employ an information group including the program from the aforementioned recording medium or an external recording medium connected through a network supplied to an output unit.

Namely, program codes read out from the recording medium implement noble functions of the present invention, so that the recording medium storing the program codes and the signals read out from the recording medium constitute the present invention.

As an example of the recording medium, there are a floppy (registered trade mark) disk, a hard disk, an optical disk, an optical magnetic disk, a CD-ROM, a CD-R, a magnetic tape, a non-volatile memory card, a ROM, an EEPROM, and the like.

According to the program associated with the present invention, the functions of the aforementioned wireless communication apparatuses according to the embodiments of the present invention can be implemented in a wireless communication apparatus controlled by the associated program.

The present application is based on and claims priority from Japanese Patent Application Serial No. 2005-233516, filed Aug. 11, 2005, the disclosure of which is hereby incorporated by reference herein in its entirety.

What is claimed:

1. A wireless communication apparatus which can perform wireless communication to a plurality of peripheral apparatuses having a wireless communication function, the wireless communication apparatus comprising:
    a searching condition setting unit which sets a searching condition according to connection schemes for the peripheral apparatuses;
    an extracting unit which performs searching communication based on the searching condition set by the searching condition setting unit to extract only the peripheral apparatuses matching with the searching condition;
    an address list storage unit which stores address information used for connection to the peripheral apparatuses extracted by the extracting unit; and
    an extracting condition setting unit which sets as an extracting condition a wireless communication state quality and an extraction number corresponding to a number of the peripheral apparatuses to be extracted;
    wherein the extracting unit extracts up to a number of peripheral apparatuses corresponding to the extraction number starting from the highest wireless communication state quality among the peripheral apparatuses matching the searching condition;

wherein the extracting unit is configured to determine whether or not all the peripheral apparatuses matching with the searching condition stored in the address list storage unit are connected, and if it is determined that unconnected peripheral apparatuses exist, after a predetermined time elapses, with reference to an address list stored in the address list storage unit, the extracting unit determines again whether or not all the peripheral apparatuses matching with the searching condition are connected.

2. The wireless communication apparatus according to claim 1, wherein the extracting unit repeats the searching communication in a predetermined time period until a connection to all the peripheral apparatuses matching with the searching condition among the peripheral apparatuses of which address information is stored in the address list storage unit is completed.

3. The wireless communication apparatus according to claim 1, further comprising a wireless connection unit which performs a connection process in the wireless communication for all the peripheral apparatuses extracted by the extracting unit.

4. The wireless communication apparatus according to claim 1, further comprising an extraction timing setting unit which receives a setting input indicating whether or not the extracting of the extracting unit is allowed to be performed at the time of starting the wireless communication apparatus.

5. The wireless communication apparatus according to claim 1, further comprising a condition input unit which receives a setting input for the searching condition according to the connection schemes,
wherein the searching condition setting unit set the searching condition received from the condition input unit.

6. The wireless communication apparatus according to claim 1, further comprising a verification input unit which receives a verification input indicating whether or not the connection process is to be performed on the peripheral apparatuses extracted by the extracting unit.

7. A wireless communication method for a wireless communication apparatus which can perform wireless communication to a plurality of peripheral apparatuses having a wireless communication function, the wireless communication method comprising:
a searching condition setting step for setting a searching condition according to connection schemes for the peripheral apparatuses;
a searching communication step of performing searching communication based on the searching condition;
an extracting step of extracting only the peripheral apparatuses matching with the searching condition in the searching communication step;
an address list storing step of storing address information used for connection to all the peripheral apparatuses extracted in the extracting step;
an extracting condition setting step of setting as an extracting condition a wireless communication state quality and an extraction number corresponding to a number of the peripheral apparatuses to be extracted;
wherein, in the extracting step, up to a number of the peripheral apparatuses corresponding to the extraction number are extracted, starting from the highest wireless communication state quality among the peripheral apparatuses matching the searching condition;
wherein the extracting step includes determining whether or not all the peripheral apparatuses matching with the searching condition stored in an address list storage unit are connected, and if it is determined that unconnected peripheral apparatuses exist, after a predetermined time elapses, with reference to an address list stored in the address list storage unit, the extracting unit determining again whether or not all the peripheral apparatuses matching with the searching condition are connected.

8. The wireless communication method according to claim 7 wherein the searching communication step and the extracting step repeat in a predetermined time period until a connection to all the peripheral apparatuses matching with the searching condition among the peripheral apparatuses of which address information is stored in the address list storing step is completed.

9. A wireless communication program for a wireless communication apparatus which can perform wireless communication to a plurality of peripheral apparatuses having a wireless communication function, the program allowing a computer to execute the steps according to claim 7.

10. A recording medium recording the wireless communication program according to claim 9.

11. An image pickup apparatus which can perform wireless communication to a plurality of peripheral apparatuses having a wireless communication function, the image pickup apparatus comprising:
a searching condition setting unit which sets a searching condition according to connection schemes for the peripheral apparatuses;
an extracting unit which performs searching communication based on the searching condition set by the searching condition setting unit to extract only the peripheral apparatuses matching with the searching condition;
an address list storage unit which stores address information used for connection to the peripheral apparatuses extracted by the extracting unit; and
an extracting condition setting unit which sets as an extracting condition a wireless communication state quality and an extraction number corresponding to a number of the peripheral apparatuses to be extracted;
wherein the extracting unit extracts only up to a number of peripheral apparatuses corresponding to the extraction number starting from the highest wireless communication state quality among the peripheral apparatuses matching the searching condition;
wherein the extracting unit is configured to determine whether or not all the peripheral apparatuses matching with the searching condition stored in the address list storage unit are connected, and if it is determined that unconnected peripheral apparatuses exist, after a predetermined time elapses, with reference to an address list stored in the address list storage unit, the extracting unit is configured to determine again whether or not all the peripheral apparatuses matching with the searching condition are connected.

* * * * *